(12) United States Patent
Chiodini et al.

(10) Patent No.: US 7,324,608 B1
(45) Date of Patent: Jan. 29, 2008

(54) EFFICIENT SUBCARRIER WEIGHTING TO ENHANCE RECEIVER PERFORMANCE

(75) Inventors: Alain Chiodini, Caganes sur Mer (FR); Thomas Edward Pare, Jr., Mountain View, CA (US)

(73) Assignee: Ralink Technology, Inc., Cupertino, CA (US)

( * ) Notice: Subject to any disclaimer, the term of this patent is extended or adjusted under 35 U.S.C. 154(b) by 774 days.

(21) Appl. No.: 10/782,276

(22) Filed: Feb. 18, 2004

Related U.S. Application Data

(63) Continuation-in-part of application No. 10/782,351, filed on Feb. 18, 2004.

(60) Provisional application No. 60/455,157, filed on Mar. 14, 2003.

(51) Int. Cl.
   H03K 9/00 (2006.01)
   H04B 1/38 (2006.01)
   H03H 7/30 (2006.01)

(52) U.S. Cl. .................. 375/316; 375/219; 375/222; 375/229; 375/232; 375/233

(58) Field of Classification Search ............... 375/222, 375/229, 232, 233, 219, 316
   See application file for complete search history.

(56) References Cited

U.S. PATENT DOCUMENTS

| | | | | |
|---|---|---|---|---|
| 4,606,047 A * | 8/1986 | Wilkinson | .................. | 375/260 |
| 5,051,709 A * | 9/1991 | Birkett et al. | .............. | 333/28 R |
| 6,320,903 B1 * | 11/2001 | Isaksson et al. | ............ | 375/232 |
| 6,973,296 B2 * | 12/2005 | Webster et al. | ............. | 455/296 |
| 7,085,315 B1 * | 8/2006 | Kelton | ....................... | 375/219 |
| 2002/0168001 A1 * | 11/2002 | Ramsey | ....................... | 375/232 |
| 2003/0081669 A1 * | 5/2003 | Yousef et al. | ............... | 375/233 |
| 2003/0128746 A1 * | 7/2003 | Lerner et al. | ............... | 375/148 |
| 2004/0005010 A1 * | 1/2004 | He et al. | ..................... | 375/260 |
| 2004/0081263 A1 * | 4/2004 | Lee et al. | .................... | 375/347 |
| 2004/0141469 A1 * | 7/2004 | Jung et al. | .................. | 370/281 |
| 2004/0141548 A1 * | 7/2004 | Shattil | ........................ | 375/146 |
| 2004/0161066 A1 * | 8/2004 | Hwang et al. | ............. | 375/350 |
| 2004/0228397 A1 * | 11/2004 | Bach | ........................... | 375/232 |
| 2005/0058194 A1 * | 3/2005 | Yousef | ........................ | 375/232 |
| 2005/0207334 A1 * | 9/2005 | Hadad | ........................ | 370/203 |

* cited by examiner

*Primary Examiner*—Mohammed Ghayour
*Assistant Examiner*—Nurul M Matin
(74) *Attorney, Agent, or Firm*—Law Offices of Imam

(57) ABSTRACT

A modem system for receiving and transmitting signals having a frequency domain equalizer (FEQ) block being responsive to a frequency channel response for processing the same to generate one or more equalizer coefficients, the modem system is responsive to an input signal for processing the same to generate frequency channel response, the input signal being generated from transmission of a transmitted signal, FEQ block for using equalizer coefficients to generate an equalized channel response, modem system for using equalized channel response to generate one or more metric weights, in accordance with an embodiment of the present invention.

18 Claims, 5 Drawing Sheets

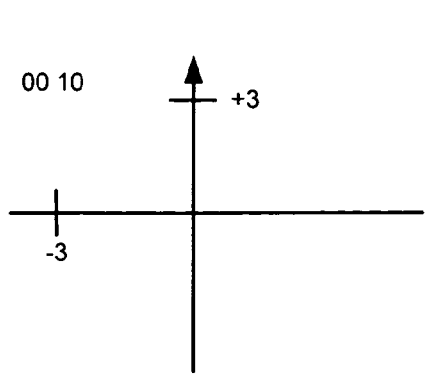
FIG. 3(a)
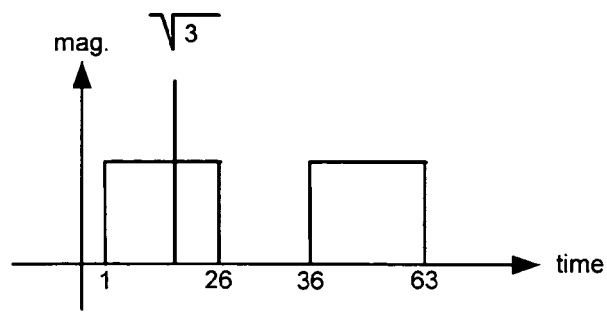
FIG. 3(d)
16-QAM
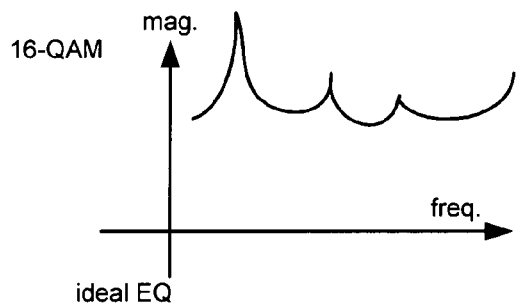
ideal EQ
computed using two reference symbols
FIG. 3(b)
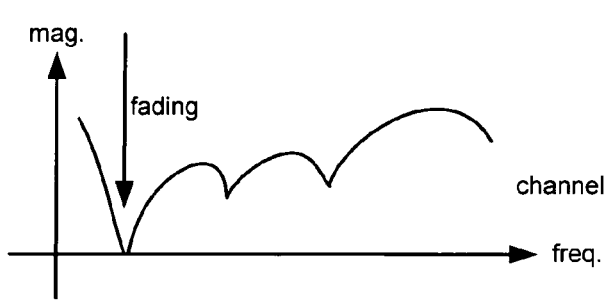
FIG. 3(c)
FEQ = Ideal seq. / r × those
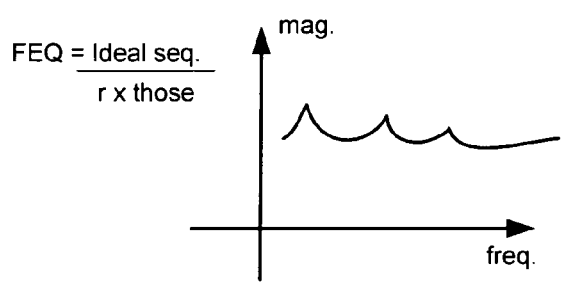
FIG. 3(f)
2 LONG symbols ∴ 52 subcarriers
p. 13 of specs
$$FEQ = \frac{L_{-26,\,26}}{(T_1 + T_2)/2}$$
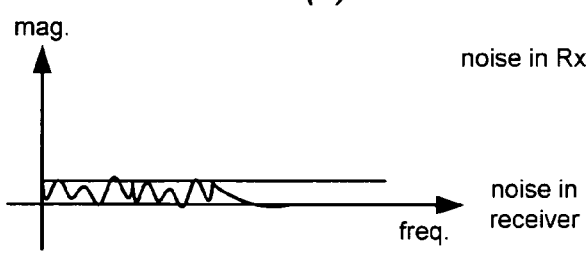
FIG. 3(e)
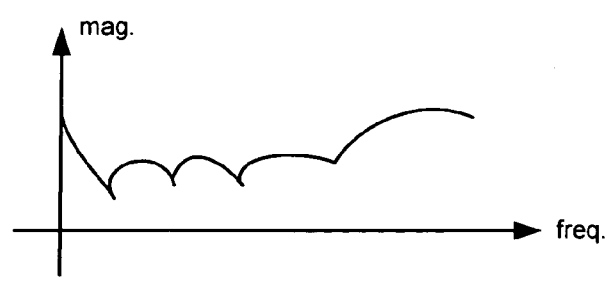
FIG. 3(g)
FIG. 3

FIG. 4

EFFICIENT SUBCARRIER WEIGHTING TO ENHANCE RECEIVER PERFORMANCE

CROSS REFERENCE TO RELATED APPLICATIONS

This application claims the benefit of a previously filed U.S. Provisional Patent Application No. 60/455,157 filed on Mar. 14, 2003, and entitled "EFFICIENT SUBCARRIER WEIGHTING TO ENHANCE RECEIVER PERFORMANCE" and is a continuation-in-part of my U.S. patent application Ser. No. 10/782,351 filed on Feb. 18, 2004 and entitled "EFFICIENT SUBCARRIER EQUALIZATION TO ENHANCE RECEIVER PERFORMANCE".

BACKGROUND OF THE INVENTION

1. Field of the Invention

The present invention relates generally to the field of wireless receivers and transmitters and particularly to a method and apparatus for weighting the subcarriers efficiently to enhance the receiver performance under the effects of multi-path channel.

2. Description of the Prior Art

As computers have gained enormous popularity in recent decades, so have networking the same allowing for access of files by one computer from another. More recently and with the advent of wireless communication, remote and wireless networking of computers is gaining more and more notoriety among personal users, small and large business owners, factory facilities and the like.

With regard to the wireless networking of personal computers including laptops, a particular modem, namely modems adapted to the IEEE 802.11a or 802.11g industry standards, are commonly employed. That is, an antenna is placed inside or nearby the personal computer and an RF chip receives signal or data through the antenna and an analog-to-digital converter, typically located within the personal computer (PC), converts the received signal to baseband range. Thereafter, a baseband processor is employed to process and decode the received signal to the point of extracting raw data, which may be files transferred remotely and wireless, from another PC or similar equipment with the use of a transmitter within the transmitting PC.

There are several prior art apparatus and techniques for implementing 802.11 g/a modem receivers, however, such prior art have not successfully utilized the fullest potential of the 802.11g/a modem. For example, the maximum rate of this type of modem device is 54 Mbits/sec. but in the presence of multi-path channel, use of current prior art methods and apparatus does not allow for reception of data at such rates. In fact, successful reception of data under multi-path channel conditions currently takes place at lower rates or may fail altogether.

Furthermore, in areas other than open locations, such as smaller office cubicles located within the inter structure of a building, prior art receivers are known to only operate at rates lower than that of the maximum operational rate of the modem, such as 54 Mbits/sec., thus preventing a user from receiving files from another PC at optimal rates. This is generally due to the prior art techniques' limitations in operating within multi-path channel conditions, which occur mostly in closed areas, such as those mentioned hereinabove. In particular, multi-path channel may result in fading a subcarrier thereby degrading the ability of a multi-carrier receiver to receive data. For 802.11a/g modems that modulate data using orthogonal frequency division multiplexing (OFDM), multi-path channel may lead to dramatic loss in data detection performance because damage to some of the subcarriers may be to the point that data bits carried by such subcarriers cannot be fully recovered. Thus, for high performance, 802.11a/g modems require minimizing the effect of faded subcarriers on the overall demodulation process.

In light of the foregoing, it is desirable to develop an OFDM modem that can receive signals, such as those specified by the 802.11a/g standards, accurately in the presence of multi-path channel and with the ability to achieve maximum data rate throughputs. The presence of multi-path channel should be mitigated in such a way as to minimize the impact of data bits carried by faded subcarriers on the overall demodulation process. Furthermore, it is essential that enhancing the performance of the OFDM receiver be accomplished without adding considerable complexity to the hardware resources employed in processing the received OFDM signal.

SUMMARY OF THE INVENTION

Briefly, an embodiment of the present invention includes a modem system for receiving and transmitting signals having a frequency domain equalizer (FEQ) block being responsive to a frequency channel response for processing the same to generate one or more equalizer coefficients, said modem system being responsive to an input signal for processing the same to generate said frequency channel response, said input signal being generated from transmission of a transmitted signal, said FEQ block for using said equalizer coefficients to generate an equalized channel response, said modem system for using said equalized channel response to generate one or more metric weights. The modem system further includes a weighting block being responsive to said metric weights, said modem system for using said equalizer coefficients to assign weighting values to each of said metric weights, said weighting block for using said metric weights to generate one or more weighted metrics, said weighted metrics for reducing the effects of fading in said frequency channel response, wherein said weighted metrics improve the performance of said modem system by mitigating the effects of fading due to multi-path channel in transmission of said transmitted signal.

The foregoing and other objects, features and advantages of the present invention will be apparent from the following detailed description of the preferred embodiments which make reference to several figures of the drawing.

IN THE DRAWINGS

FIGS. 3(a-g) show an example of a constellation point for BPSK modulation and related channel or frequency responses.

FIG. 4 shows the effect of interleaving on a particular channel as well as an FEQ frequency response and the weighting of metrics.

DETAILED DESCRIPTION OF THE PREFERRED EMBODIMENTS

Figure 1:
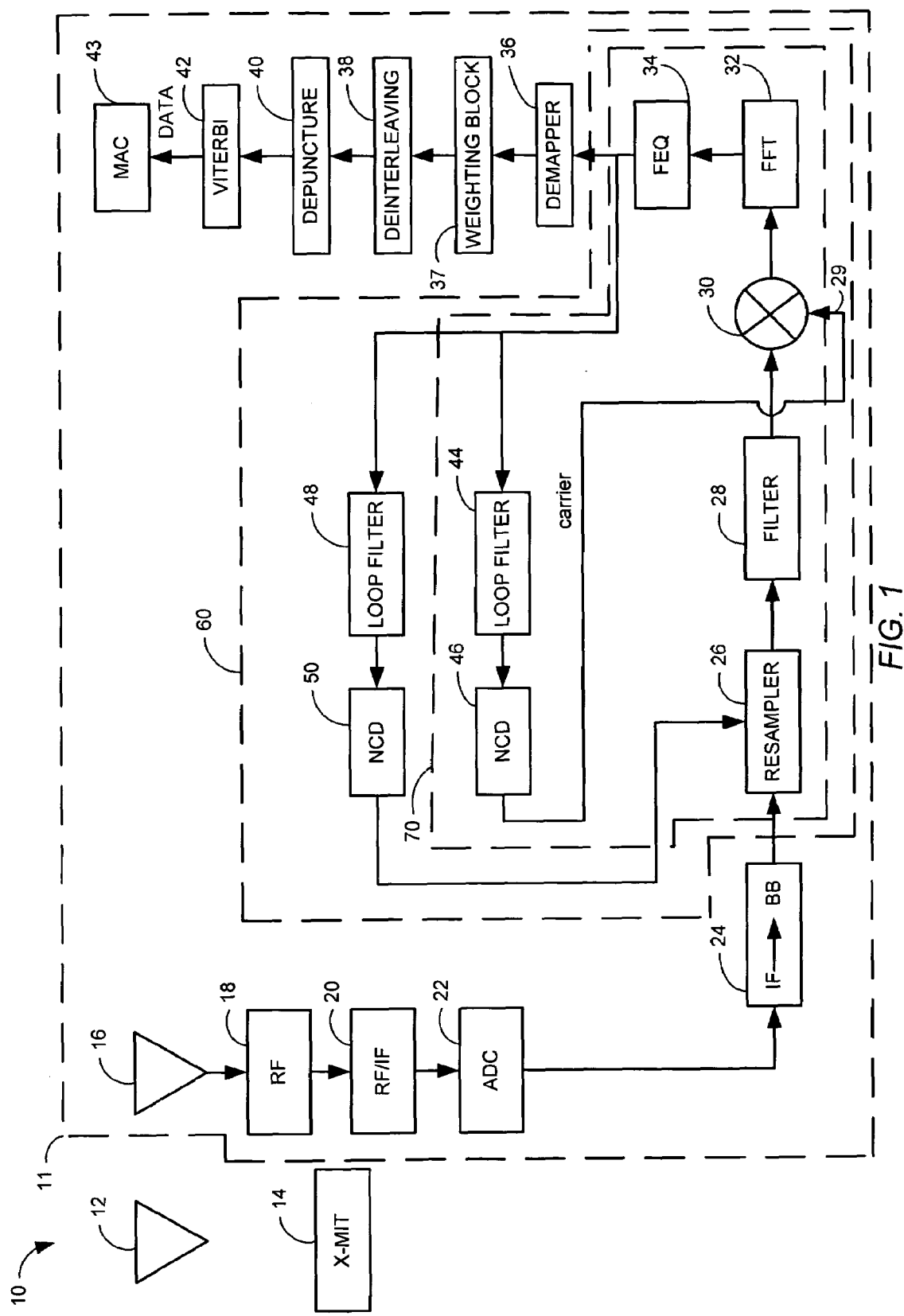
FIG. 1 shows modem system 10 is shown in accordance with an embodiment of the present invention.

When transmitted through the wireless medium, orthogonal frequency division multiplexing (OFDM)-modulated packets experience more or less severe frequency selective fading. As a result, some subcarriers may suffer a strong attenuation while others may be significantly enhanced amplitude-wise besides the fact that their phase is also affected.

Although the utilization of an equalizer (whether it is frequency or time-domain defined) allows the receiver to compensate for most of the distortion introduced by the channel, some of the subcarriers are usually damaged to the point where the data bits they carry cannot be fully recovered. Hence, it appears desirable to minimize the impact that such subcarriers have on the overall demodulation process. One possible idea is simply to weight their associated metrics according to the fading they experience. Since a frequency-domain equalizer naturally provides fading knowledge (the magnitude of the taps is inversely proportional to the fading coefficients), a straightforward idea simply consists in dividing each metric by the magnitude of its associated equalizer tap.

Since this scheme was definitely not attractive complexity-wise, each metric is scaled according to the floor value of the normalized base 2 algorithm of its associated equalizer tap. In this manner, the division (or multiplication) to be performed turns out to be nothing but a right or a left shift, which can be easily performed within application specific integrated circuits (ASICs). Simulations have shown that the demodulation gain brought by this method is around 4 dB, which is tremendous.

The present invention helps to significantly improve the performance of an OFDM demodulating block (i.e. the block comprised of the demapper, the deinterleaver, the depuncturer and the Viterbi decoder, which will be discussed in more detail shortly) when operating in the presence of a frequency-selective fading channel. The present invention requires the insertion of a weighting block between a demapper and a deinterleaver (the frequency-domain equalizer drives the weighting block) so as to, provide an extra performance gain in OFDM modem receivers, as described by the IEEE 802.11a and 802.11g standard, or other multi-carrier modem systems such as the discrete multi-tone (DMT), asymmetric digital subscriber line (ADSL), covered by the ANSI t1.413 standard.

In accordance with the present invention, received metrics (soft bits) are weighted using receiver information to improve the performance of the receiver. An array of metrics is multiplied by a set of weighting values that depend upon the magnitude of the corresponding frequency domain equalizer (FEQ) coefficients. What is presented hereinbelow is the use of equalizer coefficients, or FEQ ( ), to weight metrics to improve a Viterbi decoder performance for increasing the overall performance of a 802.11a or 802.11g receiver (data or in-coming signal is corrected in frequency by dividing metrics by equalizer coefficients or FEQ( ).

Equalizer coefficients are discussed in more detail in the U.S. patent application Ser. No. 10/782,351 filed on Feb. 18, 2004 and entitled "EFFICIENT SUBCARRIER EQUALIZATION TO ENHANCE RECEIVER PERFORMANCE", the disclosure of which is herein incorporated by reference as though set forth in full.

Referring now to FIG. 1, an 802.11g or 802.11a modem system 10 is shown to include a transmit antenna 12 coupled to a transmitter 14 for transmitting 802.11g or 802.11a signals to an 802.11g or 802.11a modem receiver system 11.

The system 11 is shown to include a receiver antenna 16 coupled to a radio frequency (RF) block 18, which is shown coupled to an RF-to-intermediate frequency (IF) block 20, which is shown coupled to an analog-to-digital converter (ADC) 22.

The ADC 22 is shown coupled to an IF-to-baseband (BB) block 24, which is shown coupled to a resampler 26, which is shown coupled to a filter 28. The output of the filter 28 is shown coupled to a mixer 30. The mixer 30 multiplies the output of the filter 28 and a carrier signal 29. The output of such multiply (or the output of the mixer 30) is then provided to a fast Fourier transformation (FFT) block 32.

The block 32 is shown coupled to a frequency domain equalizer (FEQ) block 34, which is shown coupled to a demapper 36. Demapper 36 is shown coupled to a weighting block 37, which is shown coupled to a de-interleaving block or a deinterleaver 38, which is shown coupled to a de-puncturing block or a depucturer 40, which is shown coupled to a convolutional decoder block 42, which is shown coupled to a multiply-accumulate (MAC) block 43. In one embodiment of the present invention the convolutional decoder block 42 is a Viterbi decoder. The output of the FEQ block 34 is shown to be further coupled to two loop filters, a loop filter 44 and a loop filter 48. The loop filter 44 is shown coupled to a numerical control oscillator (NCO) 46 whose output serves as the carrier signal 29 to the mixer 30 and the loop filter 48 is shown coupled to the NCO 50 whose output is shown provided to the resampler 26.

In operation, the transmitter 14 transmits a signal through the antenna 12 to the antenna 16 for reception thereof. The transmitted signal is then provided by the antenna 16 to the RF block 18, which transmits the same to the RF/IF block 20 for converting the signal to an intermediate frequency. The output of the RF/IF block 20 is fed to the ADC 22 for conversion of the intermediate frequency signal from analog form to digital form.

The output of the ADC 22 is then provided to the IF-to-BB block 24 for conversion of the radio intermediate frequency digital signal to a baseband digital signal. The output of the block 24 is then provided to the resampler 26, which interpolates and decimates the signal as controlled by the output of the NCO 50 and provides the result to the filter 28 for filtering the unneeded signals. The output of the filter 28 is multiplied by the carrier signal 29 to generate an in-coming signal which is provided to the FFT block 32 for transformation of the in-coming signal from time domain to frequency domain through the use of a fast fourier transform (FFT) on the signal.

The output of the FFT block 32, referred to herein as the frequency channel response, is then fed to the block 34 for performing frequency domain equalization thereon, which has the effect of inverting on a subcarrier-by-subcarrier basis the measured frequency channel response to generate an equalized channel response. The equalized channel response will have a magnitude which is essentially flat and will have essentially zero phase. For example, the received signal on a certain sub-carrier may be attenuated in magnitude and have negative phase. In this case, the FEQ block 34 rotates it by 180 degrees and amplifies it to remove distortions caused by the channel.

The input to the demapper 36, which includes the equalized channel response comprises a sequence of complex numbers, 48 for an 802.11a/g receiver, one for each data subcarrier, each describing a point in a constellation (an example of such constellation is shown in FIG. 3($a$)) and the output of the demapper, for each constellation point, provides a set of metric weights. Each metric weight is a single value and is associated with one information bit. Since there are multiple modulation techniques used, such as bipolar phase shift keying (BPSK) (one bit per constellation point is embedded), quadrature phase shift keying (QPSK) (two bits per constellation point is embedded), 16 quadrature amplitude modulation (QAM) (four bits per constellation point are embedded) and 64 QAM (six bits per constellation are embedded), each complex number produces a certain number of metric weights. For example, for 16 QAM, 4 metric weights are produced.

In accordance with the present invention, received metric weights (soft-bits) are weighted using the receiver information to improve the performance of the receiver. An array of metric weights is multiplied by a set of weighting values that are a function of the magnitude of the corresponding equalizer or FEQ coefficients. The received metric weights are issued by the demapper, which is a receiver module 36 shown in FIG. 1, depending on the particular modulation used on each of the sub-carriers. For example, in the case of BPSK, one metric weight is embedded onto a sub-carrier, whereas in the case of QPSK, two metric weights are embedded into a sub-carrier. For 16-QAM, four metric weights are issued per sub-carrier and so on. In the case of 64-QAM, 6 metric weights are embedded into a sub-carrier, and since in the 802.11a/g each sub-carrier is modulated identically and each symbol has 48 sub-carriers, then 288 metrics are issued for each OFDM symbol (i.e., 48 sub-carriers×6 metrics/sub-carrier). A weighting block (block 37 in FIG. 1) weights, or scales, the metric weights issued for particular sub-carrier by the magnitude of the corresponding FEQ coefficient.

Constellations for each of the modulation schemes mentioned above are presented in an IEEE Std 82.11a-1999 publication entitled "Part 11: Wireless LAN Medium Access Control (MAC) and Physical Layer (PHY) Specifications: High-speed Physical Layer in the 5 GHz Band", on pages 20-21. For example, when using 16 QAM, an input bit of '00' represents '−3' as the real component (I) and '10' respresents '3' as the imaginary component (Q) located in the constellation point of (−3,3) of the 16 QAM constellation. However, when receiving such a bit sequence, due to multi-path channel effects, such a sequence may be distorted and not exactly at the (−3,3) point. In the present invention, the Hamming distance between the expected bit sequence and the received bit sequence is measured to obtain the metric weights which are weighed using information that is received from the FEQ block 34. This is performed by a weighting block 37 inserted between the demapper 36 and the deinterleaver 38 of FIG. 1.

More specifically, if a sequence of bits, such as in the example above, is received that is supposed to be '0010' encoded into a 16-QAM symbol, it is embedded in a particular sub-carrier (of which, for 802.11a/g, there are 48 total sub-carriers). As depicted in FIG. 3, the sequence should result in a constellation point (−3,3) received at that given subcarrier. Under ideal (flat) channel conditions, as shown in FIG. 3(d), there is no fading or phase introduced so that the received symbol will be at (−3,3). However, in a multi-path channel condition where there is severe fading, as shown in FIG. 3(c), if the particular sub-carrier happens to be deeply faded as is the location indicated by the arrow, then the received symbol out of the FFT block might be attenuated to a small value (for example (0.1,−0.1)). Obviously, an appropriate FEQ will tend to undo the fading affects (as discussed earlier) and invert the channel by the appropriate scaling with a set of scalars as shown in FIG. 3(b). Again, multiplying the two curves shown in FIGS. 3(b) and 3(c) will result in a 'flat' channel. The well-known issue concerning multi-path channels is that applying a large gain to undo a deep fade can result in unwanted noise amplification. Noise, in any practical application, is always present and will be present across the entire data bandwidth, as shown in FIG. 3(e). On faded sub-carriers, the noise level can approach the level of the signal causing poor signal quality, or low signal-to-noise ratio (SNR). Application of the large FEQ coefficient to a faded sub-carrier does not change the SNR so that bit-metrics corresponding to faded sub-carriers will always be less reliable and thus should be weighted less in the decoding process. Since the magnitude of the FEQ coefficient is a clear indication of potential low SNR metrics, it is natural to weigh the metric weights, as discussed in the paragraphs above.

The channel response of the ideal equalizer is the inverse of the frequency channel response shown in FIG. 3(c). This is noted by comparing FIG. 3(b) against FIG. 3(c) wherein the channel response of FIG. 3(b) is the inverse of that of FIG. 3(c), so that when multiplied together the resulting equalized channel response is essentially flat, with no faded sub-carriers.

Several symbols are inserted in the preamble portion of the packet for the purpose of training the FEQ. For example, a certain bit sequence encoded into BPSK onto each of the sub-carriers during the preamble such that when the packet is received and processed through the FFT block, a demodulated symbol at location (1,0) should appear at a particular sub-carrier under ideal channel conditions. If instead, the demodulated sub-symbol is at constellation location (−0.5, 0), then the appropriate equalizer or FEQ coefficient for this sub-carrier is the single complex number (−2,0). This is a complex number with two dimensions, with the imaginary part equal to zero. In this case, the FEQ coefficient when applied to the received sub-symbol will invert the channel effect and return the value to the correct location of (1,0). Of course, this implementation of inverting the channel in the frequency domain is a division function, and can be expressed as:

$$(1,0)/(-0.5,0)=(-2,0).$$

The operation of inverting the channel will be affected by the presence of noise, as described in FIGS. 3(e-g). In FIG. 3(g), a typical frequency channel response profile is shown with a null in the low frequency region and amplified response at the higher sub-carrier frequencies. The corresponding noise profile, depicted in FIG. 3(e), shows moderate noise at low frequencies and less noise at the higher frequencies. In this case, the equalized channel response will be flatter in the higher frequencies, but shows more amplitude variation in the lower sub-carriers, as shown in FIG. 3(f). The reason for this is that at low noise the channel inversion is more precise and leads to a well equalized channel, whereas when a high level of noise is present, the inversion is not as accurate and will result in residual channel effects.

Typically, the FEQ block is trained using only the preamble of each packet and not with the actual data transmitted in the packet. According to the 802.11a standard, the preamble is comprised of two long symbols, each of which has 52 sub-carriers. An example of a preamble is shown on page 12 of the IEEE publication referred to hereinabove to include 10 short symbols used by an automatic gain control (AGC) to adjust the gain and frequency offset estimation.

The symbols 'T$_1$' and 'T$_2$' of the preamble are used for performing equalization. This is a well-known BPSK bit sequence.

The FEQ block 34 divides the ideal sequence represented by L$_{-26,26}$ by (T$_1$+T$_2$)/2.

The function of the demapper 36 of FIG. 1 is that for each complex coefficient that is associated with a constellation point, the demapper outputs a block of data bits. For example, for a 16 QAM modulation, if −1,1 is received, 0111 is output in accordance with constellation/symbol diagram of FIG. 116 of the referenced IEEE publication. However, rather than outputting hard bits, such as '0111', soft-decision is made and output. That is, a graduated scaling value is output by placing some weighting on the hard value.

The de-interleaving block 38 of FIG. 1 performs the reverse of interleaving by reordering the randomized bit sequence. An interleaver, such as 104 of FIG. 2 performs permutations of the received bit sequences so as to randomize burst errors due to fading. An example of the effect of interleaving as well as an FEQ frequency response and the weighting of metric weights are shown in FIG. 4.

A deinterleaver does the opposite of the interleaver in that it places the data bits back into the correct order after parsing the data bits from the various sub-carriers on which the data bits were spread. The de-interleaving block 38 generates a deinterleaved output.

Figure 4:
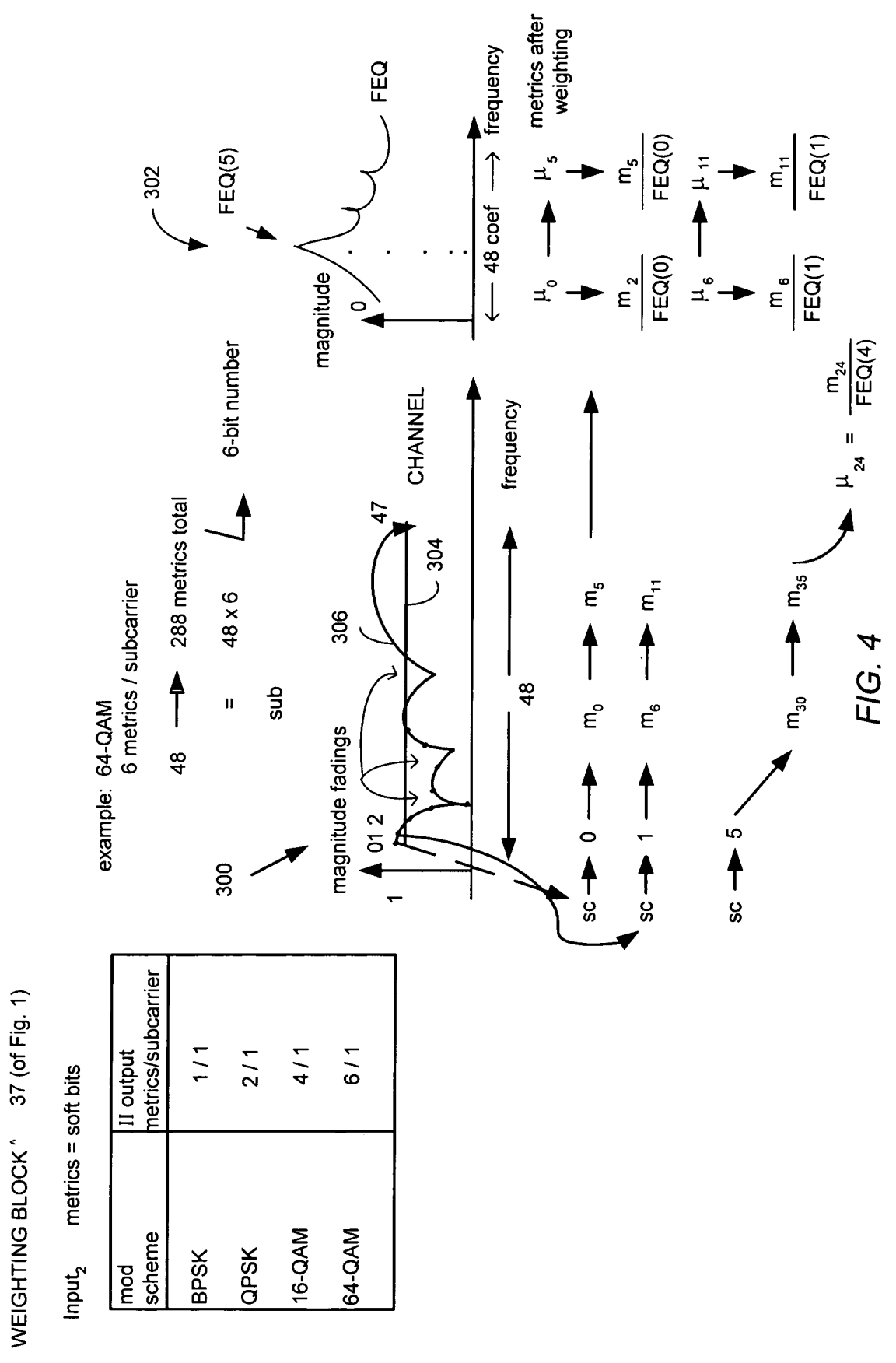

In FIG. 4, 64 QAM is used as the modulation technique and 288 bit sequences are used. Chunks of 6 bits on each sub-carrier are mapped or embedded. 288 is 48×6 sub-carriers. Due to the effects of fading, shown in the frequency response 300 of FIG. 4, rather than placing 6 consecutive bits on the same sub-carrier, consecutive bits are spread across various sub-carriers. Thus, the receiver becomes more immune to fading in the channel.

The Viterbi decoder 42 of FIG. 1 performs the maximum likelihood decoding of the received sequence with a highly reduced complexity compared to conventional approaches by taking advantage of the particular structure of the code's trellis. When a particular soft-bit sequence is entered, an output sequence is formed in a prescribed way and in accordance with a particular algorithm well known to those skilled in the art and too involved to warrant a discussion herein. The Viterbi decoder 42 knows of this equation and it will use this equation to narrow-bound the search space for the closest sequence. The Viterbi algorithm is an efficient process for decoding convolutionally encoded data that avoids searching every possibility of the $2^{288}$ outcomes in the example above.

The Viterbi decoder 42 takes the de-interleaved and de-punctured encoded bits or encoded equalizer output and generates a decoded transmitted signal by performing maximum likelihood sequence detection.

Figure 2:
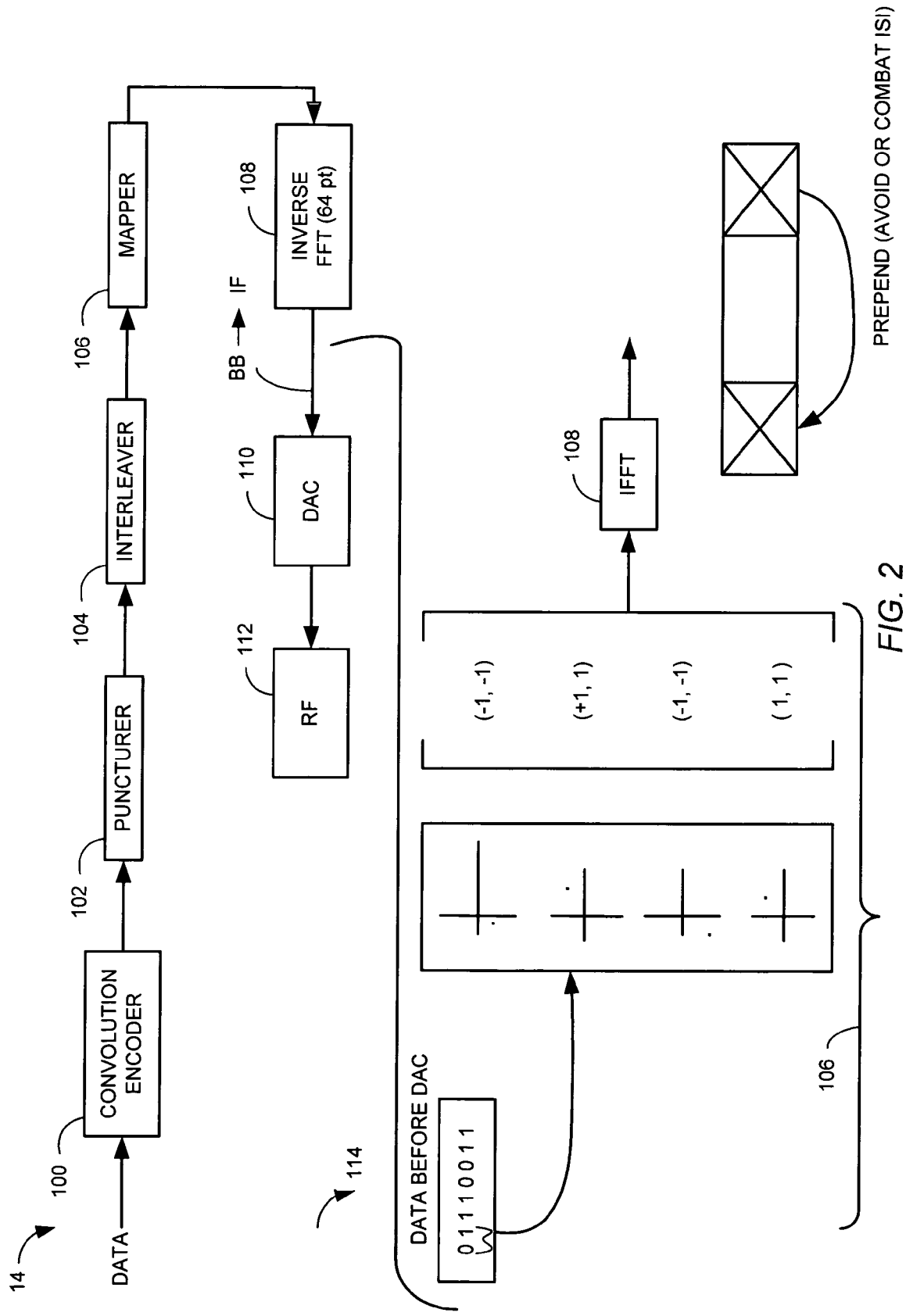
FIG. 2 shows details of the transmitter 14 of FIG. 1 in block diagram form.

FIG. 2 shows details of the transmitter 14 in block diagram form. The transmitter 14 is shown to include a convolutional encoder 100 coupled to a puncturer block 102, which is coupled to an interleaver 104, which is coupled to a mapper 106. The output of the mapper 106 includes a processed input data that is provided as the input of an inverse FFT block 108, which is coupled to a digital-to-analog converter 112, which is coupled to a radio frequency block 112.

Data for transmission is provided to the convolutional encoder block 100 for performing convolution encoding thereon so that the Viterbi decoder on the receiver side, i.e. the Viterbi decoder 42 of FIG. 1, can accurately determine the decoded transmitted signal. The output of the encoder block 100 is provided to the puncturer block 102 for changing the rate of the signal by periodically removing certain redundant data bits according to a predetermined pattern. The output of the puncturer block 102 is provided to the interleaver 104 for mixing the bit sequence so as to reduce the susceptibility of the signal to deep fadings experienced by the channel due to multi-path channel effects of multi-carriers. The output of the interleaver is provided to the mapper block 106 for passing data bits into sub-carrier symbols. An example of the function of the mapper is shown in FIG. 2 at 114.

An inverse FFT operation is performed by the inverse FFT (IFFT) block 108 on the processed input data to generate a converted data. The converted data is provided to the DAC 110, which converts the digital data to analog form for use by the RF block 112. The output of the IFFT block 108 produces an output transforming a baseband signal to intermediate frequency. The IFFT block 108 converts the signal from frequency domain to time domain and at that point the tail portion of the signal is pre-pended to the converted data as a prefix so as to eliminate or combat inter-symbol interference that could be caused by a multi-path channel.

In the present invention, the input data is processed to include channel information prior to the Viterbi decoding thus improving performance of the receiver substantially. Channel fading is due to multi-path channel effect on a multi-carrier system and like reasons, which generally results in errors in the data, the present invention improves reception by using a weighting scheme described in further detail below.

In FIG. 4, a particular sub-carrier has embedded therein a number of metricweights. For example, sub-carrier 'sc-0' has embedded therein 6 metric weights m0 to m5. At 302 is shown the frequency response of the equalizer or FEQ block 34, which is the inverse of the frequency channel response at 300. 48 coefficients are used by the FEQ block 34. In an ideal situation, the frequency channel response of the channel should be flat, as shown by the line 304 but the actual response is reflected by the graph at 306. Thus, for example, 'sc-1' or sub-carrier 1 is received with magnitude 1.2 rather than an ideal 1.

In FIG. 4, the μ's represent the weighted metrics after they have been weighed by a weighting value equal to an equalizer coefficient. For example, $\mu_0=m_0/FEQ(0)$ with $m_0$ representing the first metric weight and FEQ(0) representing component 0. $\mu_1=m_1/FEQ(0)$, $\mu_2=m_2/FEQ(0)$, …, $\mu_5=m_5/FEQ(0)$, which all belong to the first sub-carrier or 'sc-0'. As to the second sub-carrier, or 'sc-1', $\mu_6=m_6/FEQ(1)$, $\mu_7=m_7/FEQ(1)$, …, $\mu_{11}=m_{11}/FEQ(1)$ and so on for all 288 metric weights. For the sub-carrier 'sc-5', the frequency channel response is deeply faded, as seen by the first fade of the graph 300. Therefore, the integrity of the received bits or metric weights cannot be trusted, accordingly, when calculating $\mu_{30}=m_{30}/FEQ(5)$ and the rest of the 'μ's of that particular sub-carriers, the 'μ's are going to be close to zero because FEQ(5) is going to be a large number. Smaller μ-values will be counted less heavily in the Viterbi decoding process. The metric weights are divided by the magnitude of the equalizer coefficient. The output of the weighting block 37 of FIG. 1 are the weighted metrics 'μ's, which are then deinterleaved by the block 38 of FIG. 1 and ultimately depunctured by the de-puncturing block 40 of FIG. 1 to generate the encoded equalizer output. During puncturing, a number of data bits are removed in accordance with a known pattern and de-puncturing is to re-establish the pattern by placing back the removed data bits. Because the bit rate of the data or signal being received will be known, returning the missing data bits is possible. The weighting weights need to be applied prior to the de-interleaving and de-puncturing operations so that the weighting process is simplified.

Figure 5:
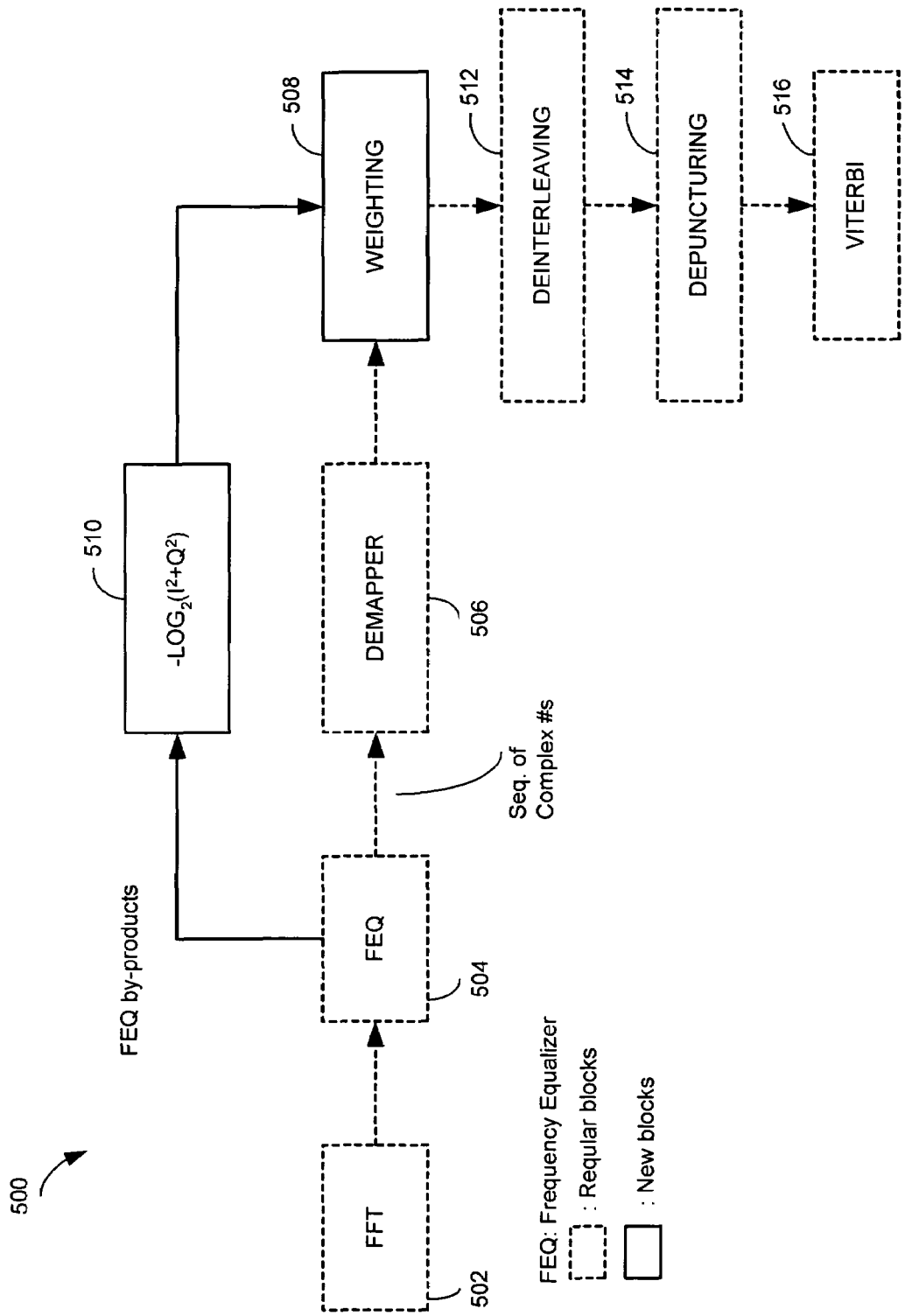
FIG. 5 shows another block diagram 500 of an embodiment of the present invention.

FIG. 5 shows another block diagram 500 of an embodiment of the present invention wherein the equalizer coefficients FEQ( )'s are utilized as weighting values to weight metric weights for improving the performance of the Viterbi decoder. In the particular embodiment of the present invention, depicted in FIG. 5, rather than performing the above divisions, which can be computationally expensive, the metric weights are shifted by a number of bits, which is the same as dividing by multiples of two. The divisors are implemented as a number of binary shifts with the number of shifts determined by quantizing the magnitude of the FEQ coefficients by a base 2 logarithm function to generate a logarithmic function value, as will be described with respect to FIG. 5. This quantizes the FEQ coefficient to its nearest power of two values, a process sometimes referred to as logarithmic quantization.

In FIG. 5, FFT is performed on the in-coming signal at 502 followed by a frequency domain equalization, such as described earlier at 504. The result is fed to the demapper at 506, which then provides input to the weighting block 508. The input to the demapper is a sequence of complex numbers and the output of the demapper is a set of metric weights for each subcarrier, as mentioned above, with the total number of metric weights depending on the modulation employed, as listed in the table of FIG. 4. The block 508 multiplies the set of metric weights received from the demapper by the logarithmic function value at 510 in order to avoid a division of the metric weights by the FEQ( )'s, which as described previously is desired to be eliminated.

The output of the weighting block 508 is the weighted metrics µ's discussed earlier, which are used by the de-interleaving block at 512. The output of the de-interleaving block 512 or the deinterleaved output is provided to the de-puncturing block 514 and the output of the de-puncturing block 514 or the encoded equalizer output is provided to the convolutional decoder 516. In one embodiment of the present invention, the convolutional decoder 516 is a Viterbi decoder.

The functions of the blocks 502, 504, 506 and 512-516 are not discussed with respect to FIG. 5 because they are the same as those discussed with respect to FIG. 1.

Another approach to implement the weighting scheme, and to avoid costly divisions, is to use the magnitude squared of the frequency channel response directly, instead of the magnitude squared of the FEQ coefficients. Note that the magnitude squared function of the FEQ coefficients is shown at block 510 of FIG. 5, and the negative sign in the block 510 is included for an efficient division operation using shifts, as discussed above. An alternate scheme is to base the weightings on the frequency channel response. The intermediate FFT computation W=FFT(T1+T2), or W=FFT (T1)+FFT(T2) can be used. In this case, the result W is the inverse of the FEQ coefficient value, and the equivalent operation can be performed as shown in block 510 except that the magnitude squared operation is performed on W, and the minus sign in block 510 is removed. Note, in this implementation, the divisions will be replaced by multiplications, which are far less expensive than divisions. To further simplify, implementation of a logarithmic quantization can be performed on these magnitude-squared frequency channel response coefficients as well.

The modem system (shown in FIG. 1) includes a processor (not shown), or computer medium, some type of storage area and a computer readable medium, for storing the software/firmware described in FIG. 5. The processor executes codes from the computer readable medium for effectuating the functions outlined in FIG. 5.

Although the present invention has been described in terms of specific embodiment, it is anticipated that alterations and modifications thereof will no doubt become apparent to those more skilled in the art. It is therefore intended that the following claims be interpreted as covering all such alterations and modification as fall within the true spirit and scope of the invention.

What is claimed is:

1. A modem system for receiving and transmitting signals comprising:

a frequency domain equalizer (FEQ) block being responsive to a frequency channel response for processing the same to generate one or more equalizer coefficients, said modem being responsive to an input signal for processing the same to generate said frequency channel response, said input signal being generated from transmission of a transmitted signal, said FEQ block for using said equalizer coefficients to generate an equalized channel response, said modem system for using said equalized channel response to generate one or more metric weights; and a weighting block being responsive to said metric weights, said modem system for using said equalizer coefficients to assign weighting values to each of said metric weights, said weighting block for using said metric weights to generate one or more weighted metrics, said weighted metrics for reducing the effects of fading in said frequency channel response, wherein said weighted metrics improve the performance of said modem system for mitigating the effects of fading due to multi-path channel in transmission of said transmitted signal.

2. A modem system as recited in claim 1 further including a convolutional decoder, said modem system for processing said weighted metrics to generate an encoded equalizer output, said convolutional decoder being responsive to said encoded equalizer output for decoding the same to generate a decoded transmitted signal.

3. A modem system as recited in claim 2 including an orthogonal frequency division multiplexing (OFDM) receiver, said OFDM receiver including said FEQ block, said weighting block and said convolutional decoder, said convolutional decoder being a Viterbi decoder, said input signal for including OFDM-modulated packets.

4. A modem system as recited in claim 3 wherein said weighting block for generating said weighted metrics by dividing said metric weight by the magnitude of said equalizer coefficient, said frequency channel response including one or more subcarriers, each of said subcarriers being assigned one or more of said weighted metrics, said subcarriers including faded subcarriers, said weighted metrics assigned to said faded subcarriers being substantially small.

5. A modem system as recited in claim 4 wherein said FEQ block generates said equalizer coefficients by inverting said frequency channel response at each of said subcarriers, said equalizer coefficient of said faded subcarrier having a substantially large amplitude for causing said weighted metrics assigned to said subcarriers to be substantially small.

6. A modem system as recited in claim 4 wherein said Viterbi decoder for de-emphasizing the effect of said faded subcarriers with small weighted metrics in decoding said encoded equalizer output, said Viterbi decoder narrowly bounding the search space in decoding said encoded equalizer output.

7. A modem system as recited in claim 3 wherein said metric weights being shifted by a number of binary shifts to generate a logarithmic function value, said number of binary shifts being determined by quantizing the magnitude squared of said equalizer coefficient by a base 2 logarithmic function, said weighting block for multiplying said metric weight by the negative of said logarithmic function value to generate said weighted metrics.

8. A modem system as recited in claim 3 further including a fast Fourier transformation (FFT) block responsive to an in-coming signal for converting the same from time domain to frequency domain to generate said frequency channel response.

9. A modem system as recited in claim 4 further including a demapper responsive to said equalizer coefficients for processing the same to generate said metric weights, said demapper generating 1 metric weight per subcarrier for bipolar phase shift keying (BPSK), 2 metric weights per subcarrier for quadrature phase shift keying (QPSK), 4 metric weights per subcarrier for 16 quadrature amplitude modulation (QAM) and 6 metric weights per subcarrier for 64 QAM modulation, said BPSK, QPSK, 16 QAM and 64 QAM being modulation techniques used on each of said subcarriers.

10. A modem system as recited in claim 9 further including a de-interleaving block response to said weighted metrics for processing the same to generate a de-interleaved output, said de-interleaving block for parsing data bits from said subcarriers and positioning said data hits back in the correct order.

11. A modem system as recited in claim 10 further including a de-puncturing block responsive to said de-interleaved output for processing the same to generate said encoded equalizer output, said de-puncturing block for inserting removed data bits to re-establish a pattern in said encoded equalizer output.

12. A modem system as recited in claim 11 said demapper, said de-interleaving block, said de-puncturing block and said Viterbi decoder comprise an OFDM demodulating block having a demodulating gain of approximately 4 dB.

13. A modem system as recited in claim 3 wherein said transmitted signal being generated by a transmitter, said transmitter including a convolutional encoder, a puncturer, an interleaver, a mapper and an inverse FFT block, said convolutional encoder for performing convolutional encoding on a transmitted input data.

14. A modem system as recited in claim 13 wherein said inverse FFT block for converting a signal from frequency domain to time domain, said inverse FFT block being responsive to a processed input data to generate a converted data, said signal having a tail portion, said tail portion of said signal being prepended to said converted data to mitigate the effects of multi-path channel.

15. A modem system as recited in claim 7 wherein said number of binary shifts being determined by quantizing the magnitude squared of said frequency channel response to generate a frequency channel logarithmic function value, said weighting block for multiplying said metric weight by said frequency channel logarithmic value to generate said weighted metric.

16. A method for receiving and transmitting signals comprising:
    receiving a frequency channel response and processing the same to generate one or more equalizer coefficients;
    receiving an input signal for processing the same to generate the frequency channel response;
    using the equalizer coefficients to generate one or more metric weights;
    assigning weighting values to each of the metric weights; and
    using the metrics weights to generate one or more weighted metrics, wherein the weighted metrics improve the performance of the modem system by mitigating the effects of fading due to multi-path channel in transmission of the transmitted signals.

17. A modem system for receiving and transmitting signals comprising: means for receiving a frequency channel response and processing the same to generate one or more equalizer coefficients;
    means for receiving an input signal for processing the same to generate the frequency channel response;
    means for using the equalizer coefficients to generate one or more metric weights;
    means for assigning weighting values to each of the metric weights; and
    means for using the metrics weights to generate one or more weighted metrics, wherein the weighted metrics improve the performance of the modem system by mitigating the effects of fading due to multi-path channel in transmission of the transmitted signals.

18. A computer readable medium having stored therein computer readable program code comprising instructions for performing the following steps:
    receiving a frequency channel response and processing the same to generate one or more equalizer coefficients;
    receiving an input signal for processing the same to generate the frequency channel response;
    using the equalizer coefficients to generate one or more metric weights;
    assigning weighting values to each of the metric weights; and
    using the metrics to generate one or more weighted metrics, wherein the weighted metrics improve the performance of the modem system by mitigating the effects of fading due to multi-path channel in transmission of the transmitted signals.

* * * * *